United States Patent [19]
Nakamura et al.

[11] 4,242,943
[45] Jan. 6, 1981

[54] BOOSTER UTILIZING FLUID PRESSURE

[75] Inventors: Akira Nakamura, Shizuoka; Masato Oguri, Susono, both of Japan

[73] Assignee: Toyota Jidosha Kogyo Kabushiki Kaisha, Toyota, Japan

[21] Appl. No.: 919,071

[22] Filed: Jun. 26, 1978

[30] Foreign Application Priority Data

Jan. 23, 1978 [JP] Japan ............... 53-535981

[51] Int. Cl.³ .............................................. F15B 9/10
[52] U.S. Cl. ............................. 91/369 A; 91/369 B; 92/84
[58] Field of Search ............. 91/369 A, 369 B, 369 R, 91/391 A, 376 R; 92/84

[56] References Cited
U.S. PATENT DOCUMENTS

| | | | |
|---|---|---|---|
| 3,110,031 | 11/1963 | Price | 91/369 A |
| 4,086,842 | 5/1978 | Kytta | 91/369 A |
| 4,100,839 | 7/1978 | Ando | 91/369 B |

Primary Examiner—Paul E. Maslousky
Attorney, Agent, or Firm—Stevens, Davis, Miller & Mosher

[57] ABSTRACT

A booster utilizing fluid pressure which is provided with a power piston disposed between a constant-pressure chamber and a variable-pressure chamber for being actuated by the pressure difference between the two chambers, a control valve actuated by shifting operation of the input member for producing the pressure difference between the constant-pressure chamber and the variable-pressure chamber, a control member disposed, being in connection with the control valve, relatively movably to the power piston in the operation direction thereof, and a spring disposed between the control member and the power piston, whereby the elastic force variation of the spring, due to the relative shifting of the control member and the power piston while in operation, may be transferred by the control member to the control valve for regulating the operation of the control valve.

14 Claims, 6 Drawing Figures

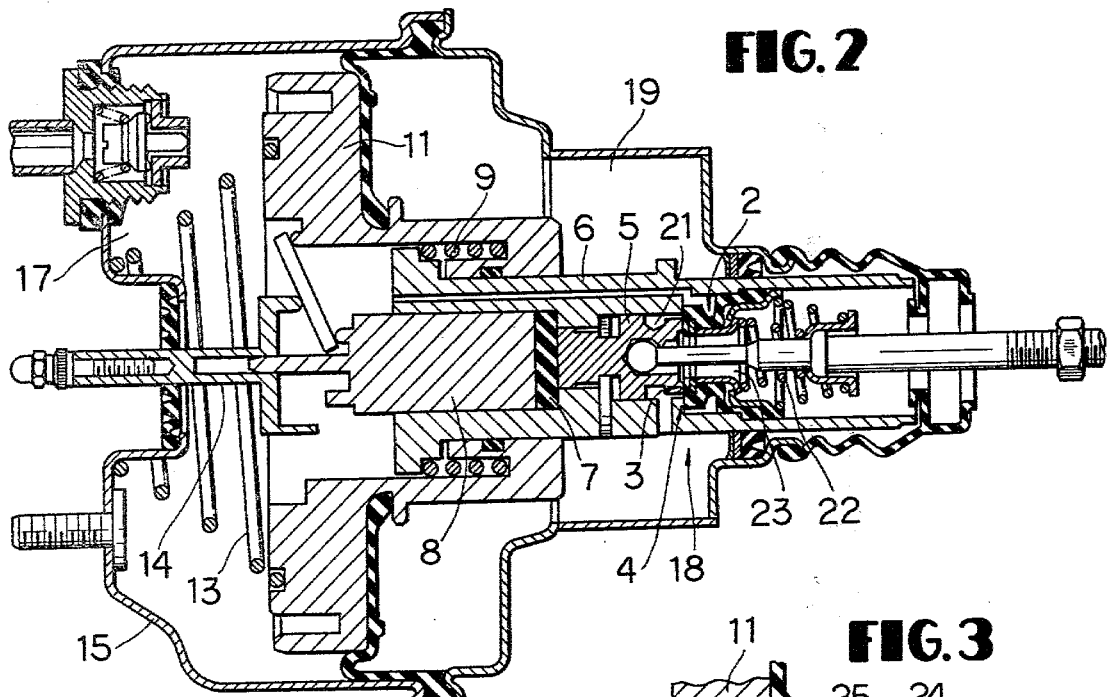
FIG. 2
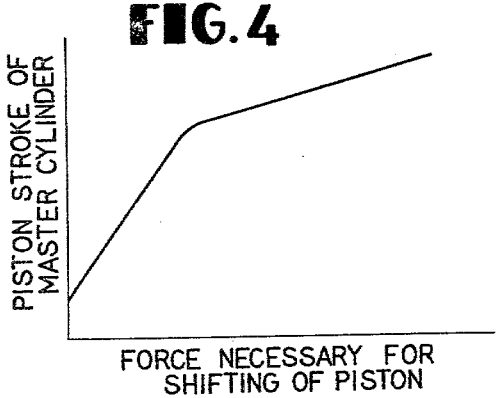
FIG. 4
PISTON STROKE OF MASTER CYLINDER
FORCE NECESSARY FOR SHIFTING OF PISTON
FIG. 3
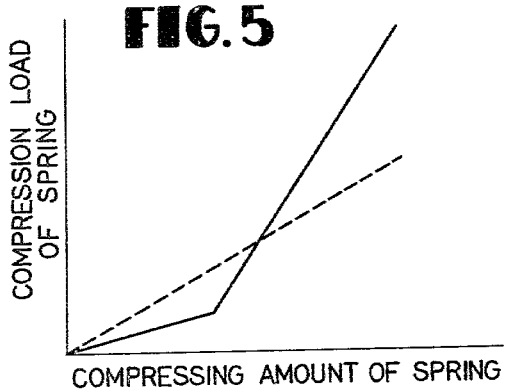
FIG. 5
COMPRESSION LOAD OF SPRING
COMPRESSING AMOUNT OF SPRING
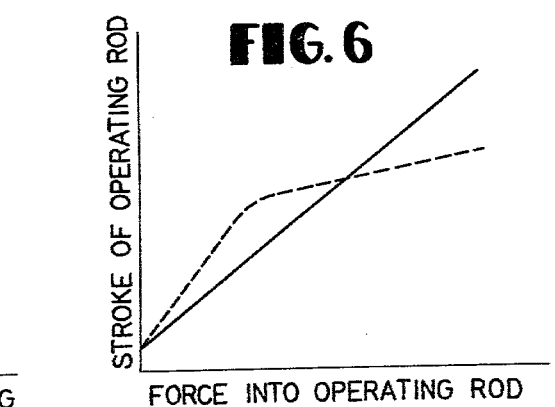
FIG. 6
STROKE OF OPERATING ROD
FORCE INTO OPERATING ROD

BOOSTER UTILIZING FLUID PRESSURE

BACKGROUND OF THE INVENTION

The present invention relates to a booster for amplifying or magnifying force applied on an operation mechanism before the force is transferred to a succeeding mechanism, more specifically, to a booster which boosts the force particularly by utilizing a liquid pressure introduced from outside.

As can be seen often requirement for increasing braking force without increasing the stroke of various operation mechanisms such as a brake pedal caused development of many types of the booster. In all of these booster devices, the shifting amount of the input member for delivering the operation force to the booster was almost equal to the shifting amount of a power piston actuated by the liquid pressure, which means these boosters are so designed such that the power piston is shifted by the entirely identical amount to that of the input member.

It follows as a logical consequence that the stroke of the input member (hereinafter called input stroke) is always equal to or larger than the stroke of the output member (hereinafter called output stroke) and that the relationship between the operation force and the stroke (hereinafter called stroke characteristic) is also definitely determined, leaving the magnifying power or ratio alone to selection or option.

It is, on the other hand, required in brake systems or others to increase the output stroke and the output of the booster without increasing the stroke and the operation force of the operation mechanism. Especially in the vehicle brakes, due to the extremely great desire for safe and easy operation, it is absolutely necessary to minimize the stroke and depressing force of brake pedalling and to improve the brake feeling, or agreeableness of brake pedalling. It is impossible, however, to fully comply with this high degree requirement as to the conventional boosters, because of the identity of the stroke amount in the input member and in the power piston, and of the inevitable definite determination of the stroke characteristic. One of the coinventors of this invention succeeded earlier in developing a booster, wherein the relationship between the shifting amount of the input member and that of the power piston, which had been deemed as absolutely identical, can be made variable at will, which is now pending as a patent application with TOKU-GAN-SHO-52 (1977)-92360, filed with the Japanese Patent Office. This invention is a further improvement of the above-mentioned invention.

SUMMARY OF THE INVENTION

It is a primary object of this invention to provide a booster utilizing fluid pressure, as simple in construction and as inexpensive in manufacturing cost as possible, which booster is variable at will in the relative amount between the shifting of the input member and the shifting of the power piston.

The gist of this invention lies in that a booster, provided with a power piston and a control valve for regulating the fluid pressure on opposite sides of the power piston, further comprises a control member, which is movable relative to the power piston while being in connection with the control valve, a spring means disposed between the power piston and the control member, for delivering the variation of the elastic force of the spring means, generated by the operation of the power piston, to the control valve via the control member, with the final object of regulating the operation of the control valve.

Owing to the introduction of such a technical concept, freedom in designing of a booster has been largely increased in comparison with the prior art wherein the power piston was directly related with the operation of the control valve.

Other and further objects, features and advantages will appear more fully from the following description.

BRIEF DESCRIPTION OF THE DRAWINGS

FIG. 2 is a similar view in another operation status;

FIG. 3 is a cross-sectional view in elevation of an essential part of another embodiment of this invention; and FIGS. 4 to 6 are graphs for explaining the operation of the embodiment shown in FIG. 3.

DETAILED DESCRIPTION OF PREFERRED EMBODIMENTS

Figure 1:
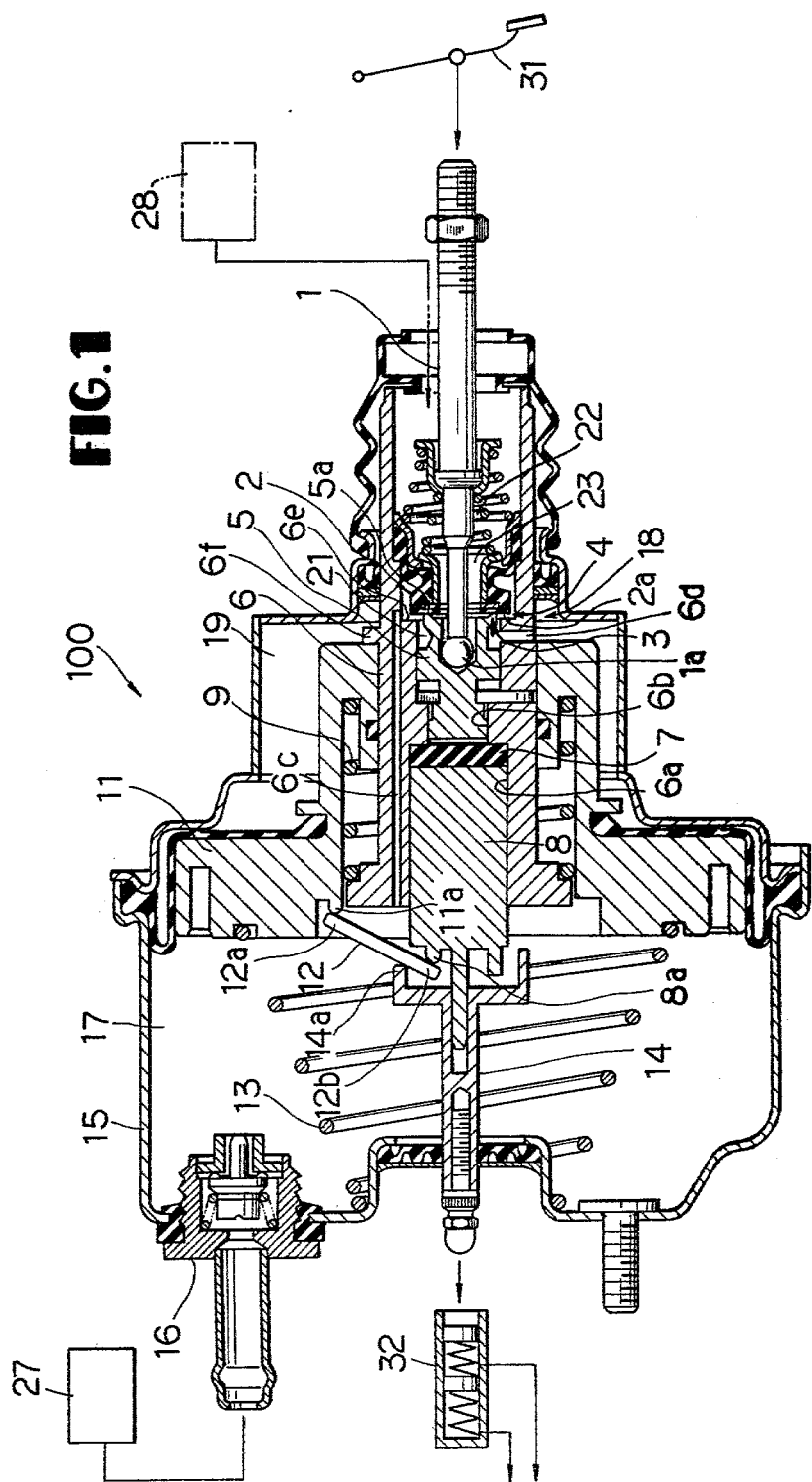
FIG. 1 is an axial cross-sectional view of a booster incorporating this invention in an operation status.

Detailed description of the invention, referring to the accompanied drawings of the preferred embodiments, will be deployed hereunder.

CONSTRUCTION

FIG. 1 shows an embodiment of a booster 100 for a vehicle brake system incorporating this invention. An input applied to an operating rod 1, an input member, from an operating mechanism such as a brake pedal 31, is magnified to be delivered to a push rod 14, an output member, for being output to a succeeding mechanism such as a master cylinder 32.

The booster 100 is provided with an air-tight casing or housing 15, the interior of which is divided by and large into two spaces 17 and 19 by a power piston 11 of diaphragm type. One space 17 is a constant-pressure chamber which is communicated, via a hose-joint 16 having a check valve, to a negative pressure source 27 such as an intake manifold of an engine, a vacuum pump, etc; the other space 19 is a variable-pressure chamber, which is varied in inside pressure by being communicated, through a control valve 18, with the constant-pressure chamber 17 or the ambient atmosphere. The power piston 11 is biased rightwards (in FIG. 1) by a return spring 13.

Into the power piston 11 is slidably fitted a control piston 6 (a controlling member), a compression spring 9 being mounted between the former 11 and the latter 6. The control piston 6 is biased leftwards by the compression spring 9, the leftward shifting of which being however restricted by abutting of a flange portion 6f of the control piston 6 on the power piston 11. The control piston 6 is a stepped cylindrical member having a large-diametered bore 6a and a small diametered bore 6b. In the former bore 6a are fitted a reaction disc 7 and an intermediate member 8; in the latter bore 6b is fitted a valve-plunger 5. The reaction disc 7 is made of a soft material, such as rubber or soft resin, for working, as if it were a fluid, in a space defined by the control piston 6, the intermediate member 8, and the valve-plunger 5, which plunger being unremovably fitted on a ball portion 1a formed on the tip of the operating rod 1 and moved therewith in unison.

The control piston 6 is provided with a communicating passage 6c, which connects the constant-pressure chamber 17 and an intermediate chamber 21, a connecting passage 6d, which connects the intermediate chamber 21 and the variable-pressure chamber 19, and a first valve seat 6e; the valve plunger 5 is on the other hand provided with a second valve seat 5a. In confrontation with these two valve seats, the first 6e and the second 5a, is disposed a poppet assembly 2 of conventional type requiring no lengthy explanation, which is biased by a compression spring 22 such that the tip surface 2a thereof is leftwardly shiftable. Between the poppet assembly 2 and the operating rod 1, running through the central portion of the casing 15, is formed a passage 23 for introducing the ambient air to the intermediate chamber 21. In other words, the control valve 18 is, in this embodiment, formed of three members, that is, the control piston 6, a first valve constituting member, the valve plunger 5, a second valve constituting member, and the poppet assembly 2, a valve member cooperating with the previous two members. For the convenience of explanation, a valve formed between the first valve seat 6e and the tip portion 2a of the poppet assembly 2 is named a vacuum valve 4, and another valve formed between the second valve seat 5a and the tip surface 2a of the poppet assembly 2 is named an air valve 3. The force from the intermediate member 8 and the power piston 11 is delivered, via a power lever 12, to the push rod 14. The power lever 12 is, at one end thereof (a first input end 12a), contacted with a projection 11a of the power piston 11 and is at the other end thereof (a second input end 12b), contacted with a projection 8a of the intermediate member 8. It is further contacted, at the middle portion thereof, with a projection 14a of the push rod 14, for delivering, while allowing a relative shifting of the power piston 11 and the intermediate member 8, the resultant force from the both to the push rod 14. The power lever 12, which is shown as if only one in FIG. 1, is in reality three in number which are disposed, with an equal circumferential distance by 120° each, respectively in an illustrated position by a well-known means (not shown).

OPERATION

While the booster is in non-operation status, the operating rod 1 is retracted by a not-shown return spring, as far as the position shown in FIG. 1, to close the air valve 3 and to open the vacuum valve 4. The variable-pressure chamber 19 is consequently, via the connecting passage 6d, the intermediate chamber 21, and the communicating passage 6c, communicated with the constant-pressure chamber 17 for being negative in pressure similarly thereto.

When the brake pedal 31 is depressed, the operating rod 1 is advanced (leftwardly shifted) accompanied by a similar directional movement of the valve plunger 5 and the poppet assembly 2, for closing the vacuum valve 4, with the result of separating or disconnecting the variable-pressure chamber 19 from the constant-pressure chamber 17. Further shifting of the operating rod 1 from this status brings about opening of the air valve 3, introducing the ambient air, via the passage 23, the intermediate chamber 21, and the connecting passage 6d, into the variable-pressure chamber 19. It causes rising of the inside pressure of the variable-pressure chamber 19 to generate a leftwardly directed force urging the power piston 11. The operating force of this power piston 11 is divided into two, one being delivered to the first input end 12a of the power lever 12 and the other to the second input end 12b of the power lever, via the compression spring 9, the control piston 6, the reaction disc 7, and the intermediate member 8. On the latter, i.e., the second input end 12b, is also delivered an input (operating force) from the operating rod 1, via the valve plunger 5, the reaction disc 7, and the intermediate member 8. The force delivered to the power lever 12 is, in turn, delivered, through the middle portion thereof, to the push rod 14 for shifting the latter leftwards, which raises the pressure inside the master cylinder 32. It causes, on the other hand, a generation of rightward reaction force acted on the push rod 14. This reaction force is delivered not only to the power piston 11, via the push rod 14 and the power lever 12, but also to the compression spring 9, via the intermediate member 8, the reaction disc 7, and the control piston 6. As the power piston 11 is shifted leftwards, the above-mentioned reaction force is consequently increased to compress the compression spring 9, which means that the power piston 11 is shifted leftwards more in amount than the control piston 6 by the very compressed amount of the compression spring 9. As the reaction force is increased, the pressure within the reaction disc 7 is accordingly increased, which in turn increases the rightwardly directed force acting on the end surface of the valve plunger 5. The valve plunger 5 will be consequently pushed back, rightwardly in relation to the control piston 6, to close the air valve 3 and to restrict the inflow of air into the variable-pressure chamber 19. The booster 100 will be stopped at the status shown in FIG. 2, i.e., at an equilibrium. The conditions required for the equilibrium can be represented by the following two equations (1) and (2), the relationship of the stroke being expressed by the third equation (3):

$$F_1 = \frac{1}{a \cdot (1 + \frac{1}{r})} \cdot F_2 \quad (1)$$

$$F_2 = \frac{a}{r} \cdot F_1 + f \quad (2)$$

$$X = \frac{f}{k \cdot (1 + r)} + x \quad (3)$$

wherein:
$F_1$ is input to the operating rod 1;
$F_2$ is operation force of the power piston 11;
$F_3$ is output from the push rod 14;
f is elastic force of the compression spring 9;
r is lever ratio of the power lever 12;
a is area ratio of cross-sectional area of the intermediate member 8 divided by that of the valve plunger 5;
k is spring constant of the compression spring 9;
x is stroke of the operating rod 1 (input stroke); and
X is stroke of the push rod 14 (output stroke).

The above-stated three equations (1), (2) and (3) indicate that the relationship between the input $F_1$ and the output $F_3$ of the booster 100 as well as the relationship between the input stroke x and the output stroke X are respectively changeable by means of varying the lever ratio of the power lever 12, the area ratio of the intermediate member 8 and the valve plunger 5, and the spring constant k of the compression spring 9.

When the brake pedal is released, the operating rod 1 is returned, by a return spring (not shown), rightwardly in FIG. 2 to open the vacuum valve 4, the air in the variable-pressure chamber 19 will consequently be drawn, via the constant-pressure chamber 17, to a not-shown source of negative pressure, resulting in a pressure drop inside the variable-pressure chamber 19. The booster 100 loses its equilibrium, causing pushing back of the push rod 14, the power lever 12, the power piston 11, the intermediate member 8, etc. rightwardly to restore the original status illustrated in FIG. 1.

This invention is not limited to the above described booster 100, which has been illustrated only for an example. Many variations and modifications are of course practicable without departing from the spirit and scope of the present invention. Some of them will be disclosed hereunder for the better understanding.

Although a simple coil spring (compression spring 9), in which compression force and compressing amount is proportionate, is mounted in the above embodiment between the power piston 11 and the control piston 6, it is possible and better for improving the stroke characteristic of a booster to substitute it for a spring of special form or to employ a plurality of springs in combination. Generally speaking, the relationship between the shifting of the piston in a master cylinder and the force necessary for the shifting of the piston is not linear, but curvilinear as shown in FIG. 4. Existence of brake clearance, likelihood of elastic deformation observed in the initial stage on some members such as the piston cup, and some other reasons seem to be responsible for the above phenomenon. When such a spring, wherein the load characteristic is linear as shown in FIG. 5 in a broken line, is employed the trend is translated to the stroke characteristic of the operating rod 1 as it is, which phenomenon is represented in FIG. 6 in a broken line. On the contrary, when so-called double springs, a pair of long and short springs 24, 25 are used, as in FIG. 3, by disposing them in parallel, wherein the load characteristic is like a solid bent line in FIG. 5, it is possible to make the stroke characteristic of the operating rod 1 linear, as shown in FIG. 6 in solid line, for improving the brake feeling.

As a transferring medium for, while allowing a relative shifting between the control piston 6 and the valve plunger 5, transferring the resultant force of the both, the above-mentioned reaction disc 7 is very effective and desirable; it is however possible to employ instead a lever 26 as shown in FIG. 3, which works similarly to the power lever 12.

This invention is applicable, not only to a booster means utilizing the negative pressure (ambient atmosphere is used as the pressure source) as above described, but also to a booster utilizing the positive pressure from an air compressor 28, shown by two-dot chain line in FIG. 1, as an alternative for the above.

This invention, as described in detail, has enabled to make different in amount the shifting of the input member and that of the output member, by slightly altering the conventional construction of the booster, doing away the idee fixe that both must be equal. It is a great step forward in designing of various systems or apparatuses incorporating the booster that freedom of designing has been enlarged to a great extent.

In conclusion, remarkable merits of this invention will be outlined hereunder:

(1) An input member of a booster can be reduced in stroke, while keeping the stroke of an output member as it used to be.

(2) By means of absorbing undesirable stroke characteristic, which is likely to appear in the succeeding mechanism, within the booster the stroke characteristic of the operation mechanism (for example, brake feeling) can be highly improved.

(3) It can be cited as one of the representative advantages of this invention that the freedom of designing has been highly enhanced. For example, in such a case wherein either one of the operation mechanism or the suceeding mechanism is modified in design thereof, this invention enables evasion of design modification in the other mechanism (the remainder) by letting the booster-to-be-inserted-therebetween absorb a possible discrepancy (or discord) of the stroke between the two mechanisms.

What is claimed is:

1. A booster, utilizing fluid pressure, for amplifying an operation force delivered from an operation mechanism in order to transfer the same to a succeeding mechanism, said booster comprising;

a power piston movably disposed between a constant-pressure chamber on one side thereof, and a variable-pressure chamber on the other side thereof, for being actuated by the pressure difference between said two chambers;

an input member which may be shifted by the operation force from said operation mechanism, said input member being on said other side of said power piston;

a control valve actuated by the shifting of said input member to communicate said variable-pressure chamber with said constant-pressure chamber or a high pressure source, which is higher in pressure than said constant-pressure chamber, for varying the inside pressure of said variable pressure chamber;

an output mechanism for transmitting the resultant force of the operation force delivered to said input member and an actuating force of said power piston to said succeeding mechanism, said output mechanism being on said one side of said power piston; and said control valve comprising a control member disposed relatively movably to said power piston, and a spring means disposed between said power piston and said control member, whereby the variation of the elastic force of said spring means produced by the operation of said power piston can be transferred, via said control member, to said control valve for regulating the operation of said control valve, said spring means biasing said control member toward said constant pressure chamber and biasing said power piston toward said variable pressure chamber.

2. A booster having an input member and an output member for amplifying, by utilizing fluid pressure, a force from said input member to transmit the same through said output member, said booster comprising:

an intermediate member disposed between said input member and said output member for transmitting the input force applied on said input member to said output member;

a power piston disposed relatively shiftably to said intermediate member, said input member being on one side of said power piston and said output member being on the other side of said power piston;

means defining a variable pressure chamber on said one side of said power piston, means defining a constant pressure chamber on said other side of said power piston;

a control valve means comprising (a) a first valve element which is disposed relatively movably to said power piston and having a first valve seat thereon, (b) a second valve element having a second valve seat thereon for being shifted by said input member, and (c) a valve for opening and closing, in cooperation with said first valve seat and said second valve seat, a communicating passage between said variable-pressure chamber and said constant-pressure chamber as well as a connecting passage between said variable-pressure chamber and a pressure source, for closing and opening the fluid passage, according to the shifting of said input member, to vary the pressure of the variable-pressure chamber, and thereby regulate the pressure difference produced between said variable-pressure chamber and said constant-pressure chamber;

a power lever, being contacted with said power piston at one end thereof and contacted with said intermediate member at the other end thereof, and further being contacted with said output member at the middle portion thereof, for delivering the resultant force from said power piston and said intermediate member to said output member, while allowing a relative shifting between said power piston and said intermediate member;

a spring means disposed between said power piston and said first valve element, said spring means biasing said first valve element toward said constant pressure chamber and biasing said power piston toward said variable-pressure chamber;

a transferring medium disposed between said intermediate member and said first and second valve elements, for transferring the resultant force applied on said two valve elements to said intermediate member while allowing relative movement between said two valve elements, whereby said control valve means is regulated so that the variation of elastic force of said spring means caused by the operation of said power piston is delivered, via said first valve element, to said control valve means.

3. A booster in accordance with claim 1 or claim 2, wherein said constant-pressure chamber is communicated with a negative pressure source which is maintained in substantially constant negative pressure, and said variable-pressure chamber is selectively communicated, by said control valve, with said constant-pressure chamber or with the ambient atmosphere.

4. A booster in accordance with claim 1 or claim 2, wherein said constant-pressure chamber is communicated with the ambient atmosphere, and said variable-pressure chamber is selectively communicated, by said control valve, with the ambient atmosphere or a pressure source higher in pressure than the ambient atmosphere.

5. A booster in accordance with claim 1, wherein said spring means is proportionately increased in elastic force to the increased amount of relative movement between said power piston and said first valve element.

6. A booster in accordance with claim 1, wherein said spring means is greater in its spring constant when the amount of relative movement between said power piston and said first valve element is great in comparison with when said amount is small.

7. A booster in accordance with claim 6, wherein said spring means comprises two compression springs of different lengths, and the shorter one begins to be compressed when the amount of relative movement between said power piston and said first valve element exceeds a preset value.

8. A booster in accordance with claim 1, wherein said first valve element is a cylindrical element slidably fitted into a central bore of said power piston in the axial direction of the latter, said second valve element is a plunger slidably fitted into said control piston and fixed to said input member, and said valve is constantly, with a spring means, biased toward the valve seats formed respectively on said cylindrical member and said plunger.

9. A booster in accordance with claim 8, wherein said cylindrical member is provided with a stepped bore having two different-diametered bore portions, in the smaller diametered bore portion being slidably fitted said plunger, and in the larger diametered bore portion being slidably fitted said intermediate member, and said transferring medium is made of a soft material filling up a space defined by the three of said cylindrical member, said plunger, and said intermediate member.

10. A booster in accordance with claim 1, wherein said transferring medium is a lever which is contacted, at one end thereof, with said first valve element, contacted at the other end thereof with said second valve element, and is further contacted at the middle portion thereof with said intermediate member, for allowing the relative movement of said first valve element and said second valve element, by means of rotating about the contact point with said intermediate member.

11. A booster in accordance with claim 5, wherein said spring means is a single compression coil spring.

12. A booster having an input member and an output member for amplifying, by utilizing fluid pressure, an operating force applied to said input member to transmit the amplified force through said output member, said booster comprising:

a housing;

a power piston movably disposed in said housing and dividing it into a constant-pressure chamber and a variable-pressure chamber, said power piston being actuated by the pressure difference between said two chambers;

a control valve actuated by said input member to control said pressure difference, said control valve comprising a control piston disposed relatively movably to said power piston;

an intermediate mechanism for transmitting the operating force toward said output member;

delivering mechanism for delivering the resultant force of the operating force transmitted through said intermediate mechanism and the actuating force of said power piston to said output member while allowing the relative movement between said power piston and said intermediate mechanism; and spring means between said power piston and said control piston for transmitting a part of the actuating force of said power piston to said control piston, said spring means biasing said control piston toward said output member and biasing said power piston toward said input member whereby upon operating of said booster, said power piston is advanced relative to said control piston while making said spring means elastically deform with a result of increasing said part of the actuating force of said power piston transmitted to said control piston.

13. A booster having an input member and an output member for amplifying, by utilizing fluid pressure, an operating force applied to said input member to transmit the amplified force through said output member, said booster comprising:
- an intermediate member disposed between said input member and said output member for transmitting said operating force toward said output member;
- a power piston disposed relatively shiftably to said intermediate member;
- means defining a variable pressure chamber on one side of said power piston, means defining a constant pressure chamber on the other side of said power piston;
- a control valve means comprising (a) a first valve element which is disposed relatively movably to said power piston and having a first valve seat thereon, (b) a second valve element having a second valve seat thereon for being shifted by said input member, and (c) a valve for opening and closing a fluid valve seat according to the shifting of said input member, to vary the pressure of the variable-pressure chamber, and thereby regulate the pressure difference produced between said variable-pressure chamber and said constant-pressure chamber;
- a power lever, being contacted with said power piston at one end thereof and contacted with said intermediate member at the other end thereof, and further being contacted with said output member at the middle portion thereof, for delivering the resultant force from said power piston and said intermediate member to said output member, while allowing a relative shifting between said power piston and said intermediate member;
- a spring means disposed between said power piston and said first valve element, said spring means biasing said first valve element toward said output member and biasing said power piston toward said input member; and
- a transferring medium disposed between said intermediate member and said first and second valve elements, for transferring the resultant force applied on said two valve elements to said intermediate member while allowing relative movement between said two valve elements, whereby said control valve means is regulated so that the variation of elastic force of said spring means caused by the operation of said power piston is delivered, via said first valve element, to said control valve means.

14. A booster having an input member and an output member for amplifying, by utilizing fluid pressure, an operation force from said input member to transmit the force to said output member, said booster comprising:
- a poppet assembly surrounding said input member;
- a housing;
- a power piston movable axially within said housing and dividing it into a constant-pressure chamber and a variable-pressure chamber;
- a control piston coaxial with said power piston, said power piston being axially movable on said control piston and relative thereto;
- biasing means between said power piston and said control piston for biasing it toward said output member and for biasing the power piston toward the input member;
- a valve plunger in said power piston and axially movable relative thereto, said valve plunger being connected to said input member and having a first valve seat thereon engagable and defining a first openable and closable valve with said poppet assembly;
- an intermediate member in said control piston and adjacent said constant pressure chamber, said intermediate member being axially movable relative to said control piston, said intermediate member being connected to said output member;
- said control piston having a second valve seat thereon engagable and defining an openable and closable second valve with said poppet assembly;
- a power lever, one end of which is in contact with the power piston, the other end of which is in contact with the intermediate member, and an intermediate section of which is in contact with the output member;
- said chambers being fluidly communicated with each other through said control piston and the second valve when the input member has no force thereon and when an operating force is applied to said input member, it moves axially toward the output member a certain distance, the second valve is closed and the first valve is opened to close fluid communication between the chambers and fluidly communicate the variable pressure chamber with a source of pressure to move the power piston in the direction of the output member and move the output member in the same direction a distance greater than the certain distance moved by the input member.

* * * * *